March 11, 1969 E. IRTI ET AL 3,432,141
SLIDE VALVES FOR FUEL FLOW AND FINE METERING
Filed June 1, 1966 Sheet 3 of 3

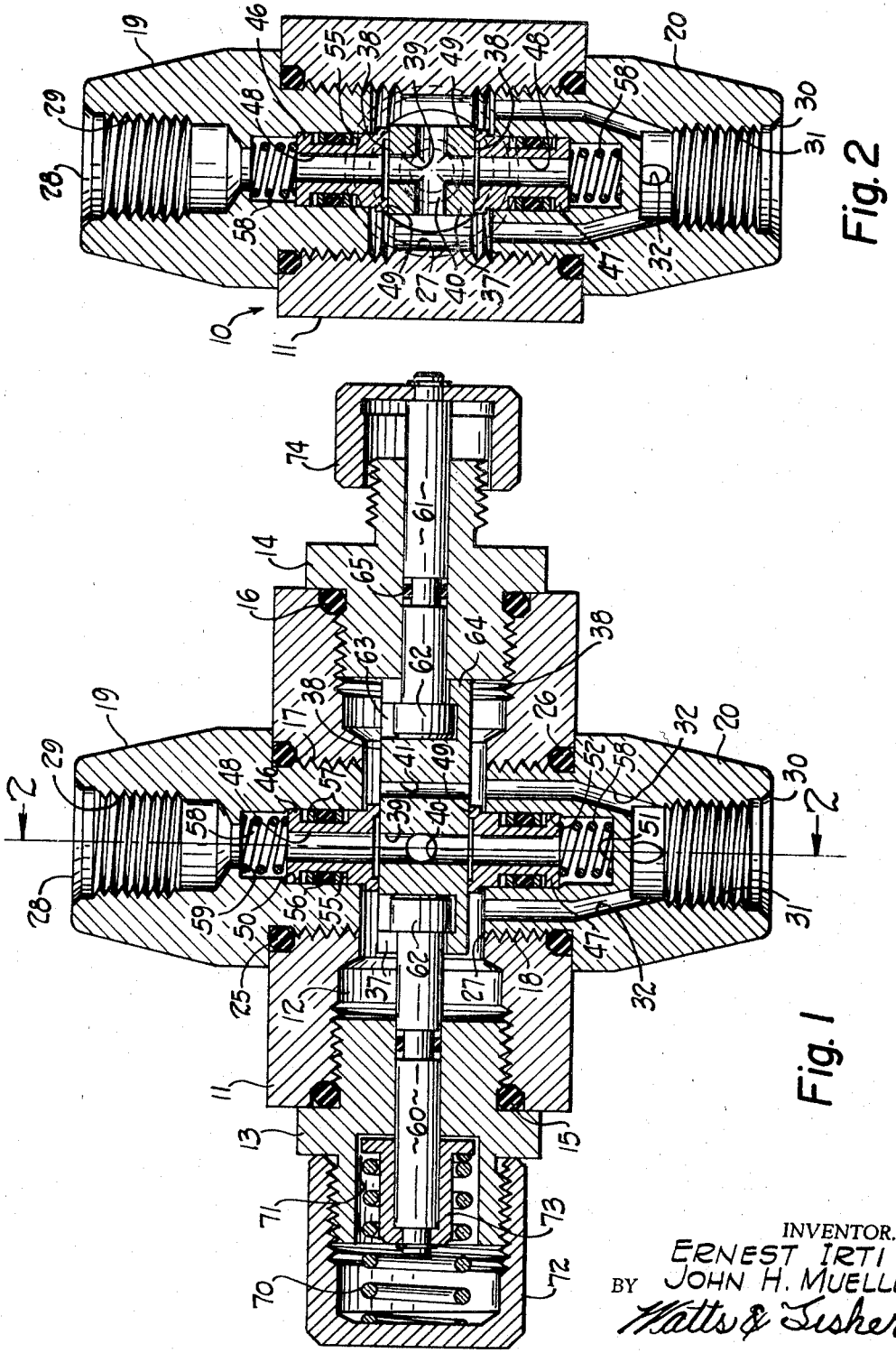

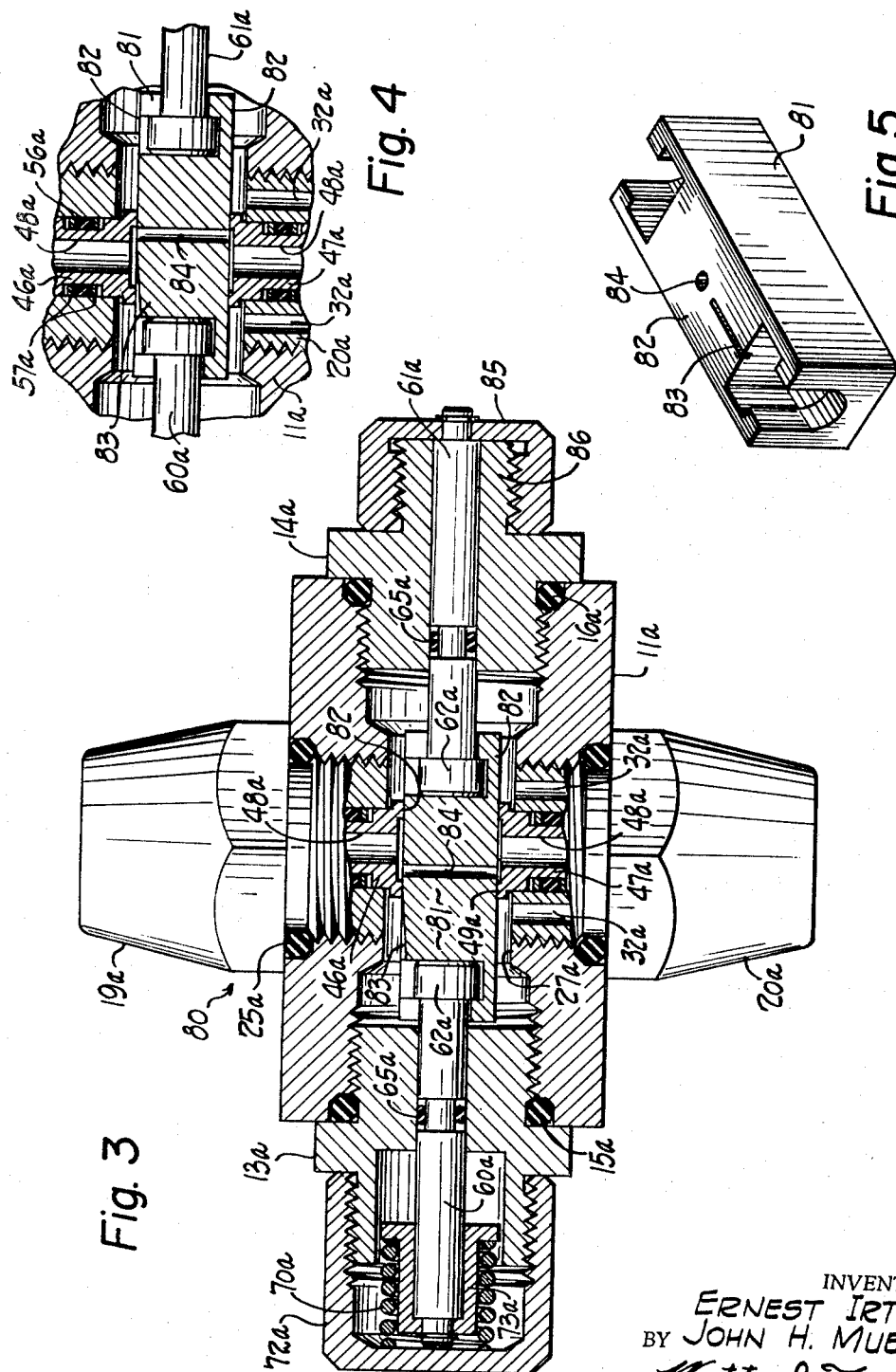

INVENTORS.
ERNEST IRTI
BY JOHN H. MUELLER
Watts & Fisher
ATTORNEYS.

United States Patent Office 3,432,141
Patented Mar. 11, 1969

3,432,141
SLIDE VALVES FOR FULL FLOW AND
FINE METERING
Ernest Irti, Parma, and John H. Mueller, Olmsted Township, Ohio, assignors, by mesne assignments, to Teledyne, Inc., Los Angeles, Calif., a corporation of Delaware
Filed June 1, 1966, Ser. No. 554,484
U.S. Cl. 251—172                                20 Claims
Int. Cl. F16k 3/26, 3/814, 3/316

ABSTRACT OF THE DISCLOSURE

A flow control valve including a slide reciprocal in a valve body chamber, a pair of plunger seals reciprocally mounted in the valve body, the plunger seals having passages therethrough and end faces projecting into engagement with opposite flat surfaces of the slide, thereby to guide the slide for movement between first and second positions, and the slide being formed to establish fluid communication between two valve ports via the slide chamber in one position of the slide, to block fluid communication between the two valve ports in the other slide position, and to provide fluid communication between the plunger seal passages in both slide positions.

This invention relates generally to flow control valves, and more specifically to fluid flow control valves of a type embodying a slide which is reciprocal within a valve chamber.

The invention is particularly concerned with a new full-flow shut-off slide valve and a fine metering valve. As will be apparent from the following detailed description, the valves of the invention are generally comprised of valve body structure having a slide chamber and at least two ports. The slide which is reciprocal in the slide chamber blocks fluid communication between the valve ports in one position and has at least one flow passage that establishes fluid communication between the inlet and outlet ports of the valve when the slide is moved toward another position.

One important feature of the invention resides in a valve as generally described wherein the slide is pressure balanced within the slide chamber. Plunger seals having axial fluid passages therethrough are reciprocally mounted in the valve body structure. An end portion of each plunger seal projects into the slide chamber and presents an annular seal face. Opposite flat surfaces of the slide are slidably engaged by the annular seal faces of the plunger seals to guide the slide for reciprocal movement. One of the plunger seal passages is preferably in open communication with the inlet port of the valve and the slide is formed to communicate the passages of both plunger seals in all positions of the slide. With this construction, the pressurized fluid admitted to the valve constantly acts on the plunger seals to force them against the slide and maintain a pressure balanced condition. The formation of the plunger seals and their cooperation with the slide serves to minimize the operating forces required to move the slide.

The new full flow shut-off valve comprises a slide having internally connected ports, at least some of which serve to communicate the inlet valve port to the slide chamber in the open position of the valve. The slide is operatively spaced from the valve outlet port so that fluid communication between the ports is established via the slide chamber by moving the slide from its closed to its open position. According to one embodiment, the internally connected slide ports are formed by a first transverse passage that communicates the plunger seal passages in the open position, a passage that intersects the first passage and communicates it to the slide chamber, and a second transverse passage that communicates the plunger seal passages in the closed position.

In another embodiment of the new full flow shut-off valve, the internally connected slide ports comprise a first transverse passage which opens on the slide surfaces engaged by the seals and a second passage which is oblique to the first passage. The ports of the first slide passage are located within the annular seal faces in both slide positions to establish constant communication between the seal passages. The oblique slide passage establishes communication between the inlet port and the slide chamber in the open position of the valve. This embodiment of the invention can be conveniently actuated by a solenoid and has the important advantage of requiring relatively short longitudinal travel of the slide due to the novel porting arrangement.

Another feature of the invention resides in a full flow shut-off valve and a fine metering valve which may embody identical valve body structure. The novel valve construction is such that it can be readily modified to affect either full flow or metered flow simply by interchanging a full flow shut-off slide and a metering slide in the valve chamber.

The preferred fine metering valve embodies a slide having a flow passage formed by a slot in one of its flat surfaces. The slot extends in the direction of slide movement and is tapered in depth along its length. By actuating the slide longitudinally in one direction, the tapered slot provides a gradual increase of fluid flow into the slide chamber, whereby a metered fluid flow through the valve is obtained.

Other features and a fuller understanding of the invention will be had from the following detailed description when taken in conjunction with the accompanying drawings.

In the drawings:

FIGURE 1 is a vertical cross sectional view of a full flow shut-off valve that forms one embodiment of the invention;

FIGURE 2 is a cross sectional view taken along the line 2—2 of FIG. 1;

FIGURE 3 is a view partially in cross section of the fine metering valve that forms another embodiment of the invention;

FIGURE 4 is a fragmentary view of the structure of FIG. 3 and shows the slide in a different position;

FIGURE 5 is a perspective view of the preferred fine metering slide;

Figure 6:
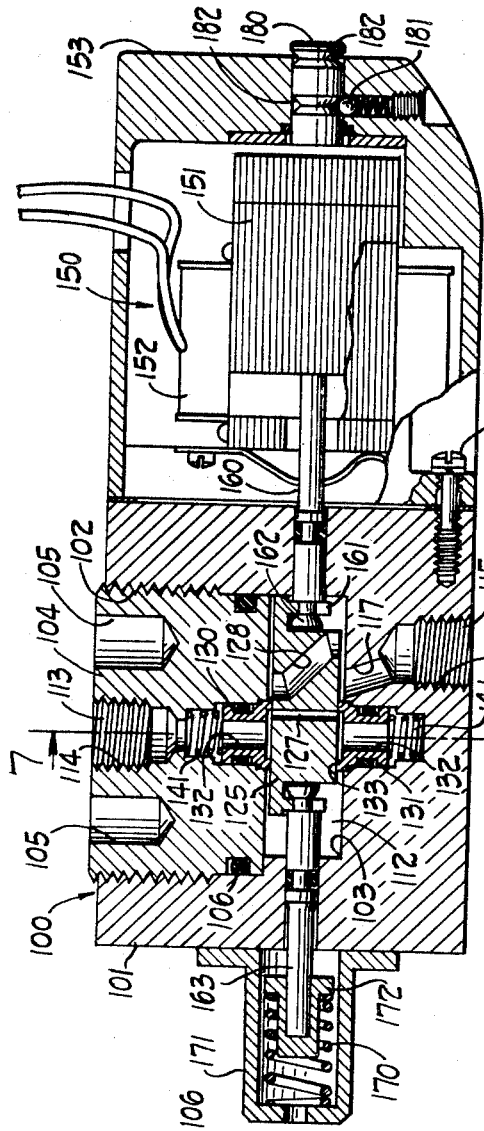
FIGURE 6 is a vertical cross sectional view of a full flow shut-off valve that forms still another embodiment of the invention.

Referring now to the drawings, and to FIGS. 1 and 2 in particular, the illustrated full flow shut-off valve is generally designated by reference numeral 10. The valve 10 comprises valve body structure including a first member 11 having a longitudinal bore 12 therethrough. The ends of the bore 12 are enlarged and are closed by end members 13 and 14 which are threaded into the enlarged end portions of the bore. Suitable O-ring seals 15 and 16 are provided between the valve body member 11 and the end members 13 and 14, respectively, to prevent any leakage of fluid between these parts.

The valve body member 11 is formed with aligned and threaded holes 17 and 18 which extend through opposite sides of the member into the central portion of the bore 12. A second generally cylindrical body member 19 is threaded into the hole 17 and projects beyond the side of the member 11. A third generally cylindrical valve body member 20 is threaded into the hole 18 and projects in the opposite direction of the member 19. O-ring seals 25 and 26 are provided between the member 11 and the members 18 and 19, respectively, to prevent fluid leakage.

The members 11, 13, 14, 19 and 20 together define a fluid-tight valve body having an internal slide chamber 27. A first fluid port 28 is formed in the member 19 and communicates with the chamber 27 through a passage 29. A second fluid port 30 is formed in the member 20 and communicates with the slide chamber 27 through an axial hole 31 that is formed partially through the member and through spaced branch passages 32 that communicate the hole 31 with the chamber.

A valve slide 37 is reciprocal within the slide chamber 27 and is spaced from the walls thereof. The valve slide 37 has opposite parallel surfaces 38 which are ground and lapped flat. In the embodiment of the invention shown in FIGS. 1 and 2, a first internal passage 39 is formed through the slide 37 and is ported on its opposite flat surfaces 38. The slide passage 39 is communicated to the chamber 27 by an intersecting passage 40 which is formed through the slide 37 and which is ported on the opposite sides of the slide between the surfaces 38. Another internal passage 41, which is parallel to the passage 39 and which is spaced therefrom, is formed through the slide 37 and is ported on the flat surfaces 38.

A pair of oppositely disposed and axially aligned plunger seals 46 and 47 are reciprocally mounted in the valve body structure for cooperation with the valve slide 37. Each of the plunger seals 46 and 47 is in the form of a rigid, tubular sleeve having an axial fluid passage 48 therethrough and an end portion which projects into the chamber 27. The inner end of each of the plunger seals that projects into the chamber presents a slide-engaging annular seal face 49 of reduced cross-sectional area relative to the cross-sectional wall area of the tubular plunger seal.

As shown, the plunger seal 46 is reciprocally disposed in a recess 50 formed in the inner end of the valve body member 19. The recess 50 is preferably formed as a continuation of the inner end portion of the fluid passage 29 so that the port 28 communicates with the passage 48 of the plunger seal 46. The valve body member 20 is formed with a blind hole 51 located between the branch passages 32. The mouth of the blind hole 51 is enlarged to define a recess 52 and the plunger seal 47 is reciprocally mounted in that recess. In order to prevent fluid leakage around the plunger seals 46 and 47, each plunger seal is formed with a circumferential groove 55 in its side wall. An O-ring seal 56 is disposed in each groove between backing rings 57.

The slide 37 is disposed within the chamber 27 so that its opposite flat faces 38 are engaged by the annular seal faces 49 of the plunger seals 46 and 47. Each of the plunger seals 46 and 47 is preferably preloaded by a spring 58 to force the seal against the slide 37. The spring acting on the seal 46 is disposed in the passage 29 between a shoulder 59 and the outer end of the seal, and the spring acting on the seal 47 is disposed in the blind hole 51. The preloading of the seals 46 and 47 by the springs 58 establishes initial and low pressure sealing of the seal faces 49 against the slide surfaces 38.

When the valve 10 is in use, the seal faces 49 of the plunger seals are urged against the slide by the combined action of the fluid pressure acting on their outer ends and the force of the springs 58 to prevent cocking of the slide during operation. The slide 37 is thus maintained with its longitudinal axis parallel to the longitudinal axis of the valve chamber and is guided for reciprocal movement by the plungers. The annular seal faces 49 of the plungers permit fluid from the passages 48 to exert a hydraulic thrust on the inner ends of the plunger seals which partially balances the oppositely acting fluid pressure on their outer ends. The illustrated construction of the plungre seals therefore obtains a differential piston area effect wherein each plunger seal will exert a force on the slide 37 due to fluid pressure which is equal to the operating fluid pressure times the area of the annular seal face 49. This differential piston area effect reduces the tendency of the plunger seals to lock against the slide 37 due to excessive hydraulic thrusts on the plunger seals, whereby the slide can be actuated by small endwise forces in relation to high fluid pressures within the valve. In addition, the effect of friction between the slide and the plunger seals is minimized by the reduced areas of engagement provided by the annular seal faces 49.

Reciprocal movement of the slide 37 between the plunger seals 46 and 47 can be accomplished in various ways which will be obvious to those skilled in the art. In the illustrated embodiment, rods 60 and 61 extend from opposite ends of the slide 37 through the end members 13 and 14, respectively. The ends of the rods 60 and 61 within the slide chamber are each provided with a head 62 and these heads are engaged within generally U-shaped slots 63 formed in the end portions of the slide 37. The slots 63 are formed to provide flanges 64 which serve to retain the heads 62 within the slots. It will be apparent from FIG. 1 that the rods 60 and 61 can be engaged and disengaged from the slide 37 simply by moving the heads of the rods into or out of the open ends of the slots 63. Suitable O-ring seals 65 are mounted in grooves formed between the ends of the rods 60 and 61 and serve to prevent leakage between the rods and the parts 13 and 14, respectively.

The slide 37 is normally urged into one of its positions by a spring 70. The spring 70 is disposed within a recess 71 formed in the outer end of the member 13 and within a cap 72 which is threaded onto the end of the member 13. The spring bears against the inner end surface of the cap 72 and agaist a flanged cup 73 which is fixed on the end of the rod 60. The end of the rod 61 which projects externally of the valve body structure is provided with a cap 74. By applying a force to the cap 74, the slide 37 can be moved against the action of the spring 70 toward the other of its positions.

When the slide 37 is disposed within the slide chamber 27 in the manner illustrated in FIGS. 1 and 2, it is urged by the spring 70 into a normally open position of the valve. In this normally open position, the slide passage 39 establishes fluid communication between the passages 48 of the plunger seals 46 and 47. The slide passages 39 and 40 cooperate to establish fluid communication between the passage of the plunger seal 46 and the slide chamber 27. Since the slide 37 is spaced from the port 30 and from the passages 32, it will thus be seen that fluid communication between the ports 28 and 30 is established via the chamber 27. Thus, pressurized fluid admitted to the valve through the port 28 flows through the passage 29, the plunger seal 46 and into the chamber through the passages 39 and 40. The pressurized fluid in the chamber 27 is then communicated through the passages 32 and 31 to the port 30.

Since the passages of the plunger seals 46 and 47 are communicated by the slide passage 39 when fluid is being transported through the valve 10, the pressurized fluid acts on both plunger seals and the force exerted on one side of the slide 37 due to the fluid pressure loading on the plunger seal 46 is equal to the force exerted on the opposite side of the slide by the fluid pressure loading on the plunger seal 47. Thus, the slide 37 is pressure balanced within the chamber 27 when the valve is open. This pressure balanced condition of the slide 37 minimizes the forces necessary to move the valve slide 37 to its closed position.

When the slide 37 is moved to its closed position by exerting a force on the cap 74 to move the slide against the force of the spring 70, the slide passage 41 communicates the passages 48 of the plunger seals 46 and 47. This communication of the plunger seals through the passage 41 of the slide maintains the pressure balanced condition of the slide when the valve is closed.

The valve 10 has been described as being normally open and as being closed by applying a force to the cap 74 to move the slide against the action of the spring 70. It will be apparent from this description that the position of the slide 37 can be reversed in the chamber 27 so that the slide passage 41 is placed in communication with the plunger seal passages by the action of the spring 70. With the slide 37 reversed, the valve is normally closed and is moved to an open position by applying a force to the cap 74 to bring the slide passage 39 into communication with the plunger seal passages 48.

Referring now to the embodiment of FIGS. 3-5, there is shown a fine metering valve 80. The metering valve 80 is comprised of valve body structure which may be identical to the valve body structure previously described above in conjunction with FIGS. 1 and 2. The elements of the metering valve 80 which correspond to the parts of the full-flow shut-off valve 10 have been identified with the same reference numerals followed by the letter a.

A metering slide 81 is mounted within the slide chamber 27a in place of the previously described slide 37. The metering slide 81 has opposite flat surfaces 82 that are slidably engaged by the annular seal faces 49a of the plunger seals 46a and 47a. As in the embodiment of FIGS. 1 and 2, the seals 46a and 47a are preloaded by springs (not shown). A slot 83 is formed in the slide surface 82 engaged by the plunger seal 46a. The slot 83 extends in the direction of slide movement and is tapered in depth along its length. The illustrated metering slide 81 is also formed with an internal passage 84 which is spaced from the shallow end of the slot 83 and which is ported on the opposite flat surfaces 82.

The metering slide 81 is longitudinally movable within the slide chamber 27a to a closed position shown in FIG. 3 in which the slot 83 is spaced from the annular seal face of the plunger seal 46a and in which the passages 48 of the plunger seals 46a and 47a are communicated by the slide passage 84. In this closed position of the valve, pressurized fluid admitted to the valve acts on the outer ends of the plunger seals 46a and 47a to force the annular seal faces tight against the flat surfaces 82 of the slide 81. A balanced pressure condition of the metering slide similar to that described above in conjunction with the embodiments of FIGS. 1 and 2 is thus obtained.

When the slide 81 is actuated from the closed position, the tapered slot 83 moves across the annular seal face 49a of the plunger seal 46a. The movement of the tapered slot 83 across the annular seal face of the plunger seal 46a provides a gradual increase of area for fluid flow into the chamber 27a. The pressurized fluid within the chamber 27a is communicated to the port (not shown) of member 20a through the passages 32a. In order to move the slide 81 incrementally to effect the metered flow of pressurized fluid, a cap 85 which is internally threaded is mounted on the external end of the rod 61a. The internal threads of the cap 85 are engageable with threads formed on an axially extending end portion 86 of the member 14a.

When the metering slide 81 is mounted in the chamber 27a in the manner illustrated in FIGS. 3 and 4, the spring 70a acting on the rod 60a produces a force on the slide which tends to urge it toward the fully open position of FIG. 4. As the cap 85 is threaded inwardly on the projection 86, the slide is incrementally moved to its closed position. It will be seen that the slide 81 can be reversed in the chamber 27a so that the cap 85 can be threaded inwardly on the projection 86 to gradually increase the volume of metered fluid flow from the port 30a.

It will also be seen from FIGS. 3 and 4 that the slide passage 84 is within the annular seal faces 49a of the plunger seals 46a and 47a in all positions of the slide 81. Since the pressurized fluid admitted to the valve is communicated to the outer ends of plunger seals 46a and 47a in all positions of the slide, the slide is maintained in a constant pressure balanced condition.

One important feature of the invention is the manner in which the described valves 10 and 80 can be readily modified to affect either full flow or metered flow simply by interchanging the slides 37 and 81. When it is desired to change the slides, it is merely necessary to remove the cap 74 or 85 from the rod 61. The member 13 can then be disconnected from the member 11 and the slide together with the connected rods 60 and 61 can be withdrawn from the bore of valve body member 11. One slide is replaced by the other in connection with the rods 60 and 61 and the slide and rod assembly is replaced in the member 11. In both modifications, the plunger seals are pressure loaded in all positions of the slides so as to maintain a pressure balanced condition that minimizes the required operating pressures and prevents cocking of the slides in the slide chamber.

Another feature of the invention described in conjunction with FIGS. 1-5 resides in the simplicity of the valve body structure. The valve body structure is comprised of nearly identical members 19 and 20 which are simply threaded into holes formed in the cylindrical member 11. These parts together with the end members 13 and 14 can be inexpensively manufactured and easily assembled.

Figure 8:
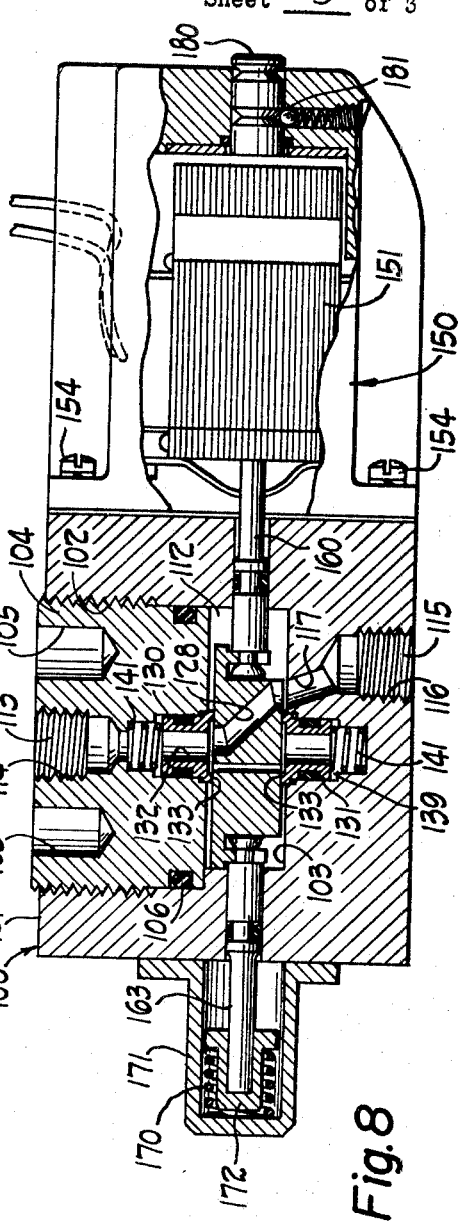
FIGURE 8 is a view similar to FIG. 6 showing the valve slide in another position.
Figure 7:
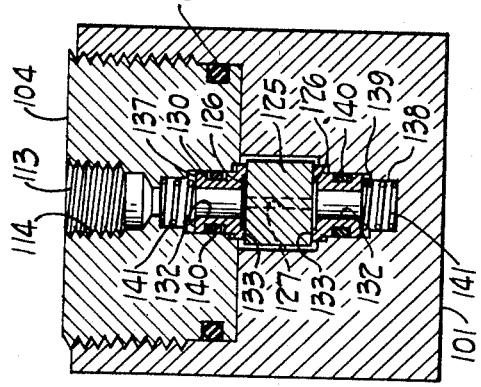
FIGURE 7 is a cross sectional view taken on the line 7—7 of FIG. 6.

Reference is now made to FIGS. 6-8 which illustrate another embodiment 100 of a full-flow shut-off valve constructed according to the present invention.

The valve 100 comprises valve body structure including a first member 101 having an opening 102 which is formed partially through the member and a slot 103 which is formed in the member at the bottom of the opening 102. A second generally cylindrical member 104 is threaded into the opening 102. Suitably spaced holes 105 may be formed in the outer end of the member 104 so that it can be inserted and removed from the threaded opening 102 by a wrench. An O-ring seal 106 which is mounted in a groove near the inner end of the member 104 prevents fluid leakage between the members 101 and 104.

The inner end of the member 104 cooperates with the walls of the slot 103 to define a slide chamber 112. A first fluid port 113 is formed in the member 104 and communicates with the chamber 112 through a passage 114. A second fluid port 115 is formed in the member 101 and communicates with the slide chamber 112 through a hole 116 and through a passage 117 that communicates the hole 116 with the chamber.

A valve slide 125 is reciprocal within the slide chamber 112. The valve slide 125 has opposite parallel surfaces 126 which are ground and lapped flat. In this embodiment of the invention, a first transverse passage 127 is formed through the slide 125 and is ported on its opposite flat surfaces 126. A second internal passage 128, which is spaced from and which is oblique to the passage 127, is formed through the slide 125 and is ported on the flat surfaces 126.

A pair of oppositely disposed and axially aligned plunger seals 130 and 131 are reciprocally mounted in the valve body structure for cooperation with the valve slide 125 in the manner previously described in conjunction with the embodiments of FIGS. 1-5. As in the other embodiments of the invention, each of the plunger seals 130 and 131 has an axial fluid passage 132 therethrough and an end portion which projects into the slide chamber 112. The inner end of each of the plunger seals that projects into the slide chamber presents a slide-engaging annular seal face 133 of reduced cross-sectional area relative to the cross-sectional wall area of the tubular plunger seal.

The plunger seal 130 is reciprocally disposed in a recess 137 formed in the inner end of the valve body member 104. The recess 137 is preferably formed as a continuation of the inner end portion of the fluid passage 114 so that the port 113 constantly communicates with the passage 132 of the seal 130. The valve body member 101 is formed with a blind hole 138 and the mouth of the hole is enlarged to define a recess 139 in which the plunger seal 131 is reciprocally disposed. Each plunger seal 130 and 131 has a circumferential groove in its side wall and a suitable O-ring seal 140 is disposed in each groove.

The slide 125 is disposed within the chamber 112 so that its opposite flat faces 126 are slidably engaged by the annular seal faces 133 of the plunger seals 130 and 131. Each of the plunger seals 130 and 131 is preferably preloaded by a spring 141 to force the seal against the slide 125. As previously discussed, the springs acting on the seals 130 and 131 establish initial and low pressure sealing of the seal faces 133 against the slide surfaces 126.

In the embodiment of FIGS. 6–8, the valve 100 is operated by a solenoid 150. The solenoid 150 includes a solenoid core 151 and a coil 152. The solenoid 150 is mounted in a housing 153 which is suitably secured to the valve body member 101, as by screws 154. A rod 160 extends from the solenoid core 151 through the adjacent wall of the valve body member 101 into the slide chamber 112. The end of the rod 160 within the chamber 112 is engaged in a generally U-shaped slot 161 formed in the adjacent end of the slide 125. The end of the rod 160 is formed with a head 162 which serves to retain the rod within the slot 161. A rod 163 which may be identical to the rod 160 extends through the opposite wall of the valve body member 101. Suitable O-ring seals 164 are mounted in grooves formed between the ends of the rods 160 and 163 and serve to prevent leakage between the rods and the walls of the valve body member 101.

The slide 125 is normally urged into one of its positions by a spring 170. The spring 170 is disposed within a cap 171 which is secured to a wall of the valve body member 101. The spring 170 bears against a cup 172 which is mounted on the end of the rod 163. When the slide 125 is disposed within the slide chamber 112 in the manner illustrated in FIGS. 6 and 8, it is urged by the spring 170 into a normally closed position of the valve (FIG. 6). In this closed position the ports of the transverse slide passage 127 lie within the annular seal faces 133 of the plunger seals 130 and 131. The slide passage 127 thus communicates the plunger seal passages 132 so that the seals 130 and 131 are urged against the slide 125 by the fluid pressure transmitted to the valve through the port 113. Thus, the slide 125 is pressure balanced within the chamber 112 when the valve is closed.

The slide 125 is moved to the open position of the valve (FIG. 8) by actuation of the solenoid 150. In the open position the slide 125 is maintained in a pressure balanced condition by communication of the seal passages 132 through the transverse slide passage 127. As shown in FIG. 8, the port of the oblique slide passage 128 that opens on the slide surface engaged by the seal 130 is disposed within the annular seal face 133. The port of the oblique slide passage 128 that opens on the slide surface engaged by the seal 131 is located adjacent to and substantially in alignment with the chamber opening of the passage 117 which communicates with the port 115. Thus, pressurized fluid admitted to the valve 100 through the port 113 flows through the passage 114, the plunger seal 130 and the slide passage 128. The pressurized fluid is then communicated to the outlet port 115 through the passage 117 and the hole 116. The formation of the oblique flow passage 128 and the porting of the passage adjacent the chamber opening of the passage 117 when the valve 100 is open minimizes the pressure drop of fluid flowing through the valve.

An important feature of the valve 100 resides in a construction which requires relatively short longitudinal travel of the slide 125 between its fully opened and fully closed positions and which at the same time obtains a pressure balanced condition of the slide in both positions. This advantageous construction results from the novel slide porting arrangement including the transverse passage 127 which lies within the annular seal faces in both slide positions and the oblique slide passage 128 which has one port closely adjacent a port of the passage 127. The compact valve construction and the short longitudinal travel of the slide are particularly useful in a solenoid operated valve assembly.

If desired, the valve 100 may be provided with a manual override which can be used to position the slide 125 in the event of a power failure. The manual override is comprised of a short rod 180 which is slidably received through the rear wall of the housing 153. A spring pressed ball detent 181 is mounted in the housing 153 for cooperation with axial grooves 182 in the rod 180. With this arrangement, the slide 125 can be positioned manually by pressing on the outer end of the rod 180. The ball detent 181 cooperates with the rod to hold the slide in position without manual force.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:
1. A valve comprising in combination:
 (a) valve body structure including:
  (i) a slide chamber,
  (ii) first and second ports, said second port being in open communication with said chamber,
  (iii) a first recess communicating with said first port and opening into said chamber,
  (iv) a second recess opening into said chamber,
 (b) first and second plunger seals reciprocally mounted in said first and second recesses, respectively,
 (c) each of said plunger seals having a fluid passage therethrough and an end portion which projects into said chamber and presents a seal face,
 (d) a slide longitudinally movable in said chamber between first and second positions,
 (e) said slide having opposite flat surfaces slidably engaged by said seal faces of said plunger seals thereby to guide said slide for reciprocal movement,
 (f) said slide having internally connected ports on said flat surfaces which provide fluid communication between said plunger seal passages in both slide positions, and having a flow passage which establishes communication between said first seal passage and said chamber in said first slide position and which is spaced from said first seal passage in said second position,
 (g) said slide being operatively spaced from said second port in all positions so that fluid communication between said ports is blocked when said slide is in said second position and so that fluid communication between said ports is established via said chamber by moving said slide from said second position to said first position,
 (h) means in said valve acting on one end of said slide to urge it toward one of said positions,
 (i) and a member at the opposite end of said slide for applying force to move it toward the other of said positions.
2. A valve as claimed in claim 1 wherein said flow passage of said slide is formed by a slot in the flat surface engaged by said first plunger seal, said slot being tapered in depth in the direction of slide movement from said second position to said first position so that a gradual increase of area for fluid flow into said chamber is provided by moving said slide to said first position.
3. A valve as claimed in claim 2 wherein said internally connected slide ports are formed by a transverse passage through said slide, said transverse passage opening on said opposite flat surfaces and being spaced from the end of said slot which is of minimum depth.

4. A valve as claimed in claim 3 wherein said member at the opposite end of said slide comprises a rod having an end portion extending externally of said valve body structure, and means on said rod end portion threadedly engaged with said valve body structure so that the rod can be incrementally advanced into said valve body structure to move said slide.

5. A valve as claimed in claim 1 wherein said flow passage and said internally connected ports of said slide comprise a first transverse passage which is formed through said slide and has openings on said flat surfaces that communicate with said seal passages in said first position, another passage which intersects and communicates said first passage to said chamber, and a second transverse passage which is spaced from said first passage and has openings on said flat surfaces that communicate said seal passages in said second position.

6. A valve as claimed in claim 1 wherein said internally connected slide ports are formed by a transverse passage through said slide, said transverse passage having openings on said opposite slide surfaces in communication with said seal passages in both slide positions, and wherein said flow passage is formed by another passage through said slide, said another passage having openings that communicate said first seal passage to said chamber in said first slide position.

7. A valve as claimed in claim 1 wherein said valve body structure comprises a first body member in which said chamber is formed, end members connected to the ends of said first body member to close the ends of said chamber, said first body member having a pair of holes formed through its wall transverse to the longitudinal axis of said chamber, and second and third body members mounted in said holes, said first port and said first recess being formed in said second body member, and said second port and said second recess being formed in said third body member.

8. A valve as claimed in claim 7 wherein said second body member has an outer end, an inner end and a passage therebetween which communicates said first port with said chamber, said first recess being formed as a continuation of the inner end portion of said second body member passage; and wherein said third body member has at least two passages communicating said second port with said chamber, said second recess being formed between said two passages.

9. A valve comprising in combination:
 (a) valve body structure including:
  (i) a slide chamber, and
  (ii) first and second ports, said second port being in open communication with said chamber,
 (b) first and second plunger seals reciprocally mounted in said valve body structure,
 (c) said plunger seals having fluid passages therethrough and end portions which project into said chamber and present seal faces,
 (d) said first plunger seal passage being in constant fluid communication with said first port,
 (e) a slide reciprocal in said chamber between said plunger seals,
 (f) said slide having opposite flat surfaces engaged by said seal faces, thereby to guide said slide for movement between first and second positions,
 (g) said slide having internally connected ports which communicate said first seal passage with said second seal passage and with said chamber in said first position, and having an internal passage which is spaced from said internally connected ports and communicates said seal passages in said second position,
 (h) said slide being operatively spaced from said second port in all positions so that fluid communication between said ports is blocked when said slide is in said second position and so that fluid communication between said ports is established via said chamber when said slide is in said first position,
 (i) means in said valve body structure acting on one end of said slide to urge it toward one of said positions,
 (j) and means at the other end of said slide for selectively applying a force to move it toward the other of said positions.

10. A valve as claimed in claim 9 wherein said valve body structure is formed with recesses, and wherein said plunger seals are reciprocally mounted in said recesses in axial alignment, said seal faces of said plunger seals being constantly urged against said slide by fluid under pressure which is transmitted through said first port and seal passages to act on the ends of said plunger seals opposite to their seal faces.

11. A valve as claimed in claim 10 wherein said internally connected slide ports are formed by a transverse passage which opens on said flat surfaces and by another passage which intersects said transverse passage and communicates it with said chamber.

12. A valve comprising in combination:
 (a) valve body structure having a slide chamber and first and second ports, said second port being in communication with said chamber,
 (b) first and second plunger seals reciprocally mounted in said valve body structure,
 (c) each of said plunger seals having a fluid passage therethrough and an end which projects into said chamber and presents an annular seal face,
 (d) said first plunger seal passage being in open fluid communication with said first port,
 (e) a slide having opposite flat surfaces reciprocal in said chamber,
 (f) said slide surfaces being engaged by said seal faces, thereby to guide said slide for reciprocal movement between first and second positions,
 (g) said slide having:
  (i) a first internal passage ported on said opposite surfaces, the ports of said first slide passage being located within said annular seal faces in both slide positions so that said seal passages are in constant fluid communication through said first slide passage,
  (ii) a flow passage which establishes fluid communication between said first seal passage and said chamber in said first slide position and which is spaced from said first seal passage in said second slide position,
 (h) and means acting on said slide for moving it from one position to another.

13. A valve as claimed in claim 12 wherein said flow passage of said slide is formed by a slot in the flat surface engaged by said first plunger seal, said slot being tapered in depth in the direction of slide movement from said second position to said first position so that a gradual increase of area for fluid flow into said chamber is provided by moving said slide to said first position.

14. A valve as claimed in claim 12 wherein said flow passage of said slide is formed by a second internal passage, said second internal passage having one port on the flat surface engaged by said first seal, said one port being adjacent a port of said first internal passage and lying within the annular seal face of said first seal when said slide is in said first position, and said second internal passage having another port which communicates with said chamber and is spaced from both annular seal faces in both slide positions.

15. A valve comprising in combination:
 (a) valve body structure including:
  (i) a slide chamber,
  (ii) a first recess formed in a wall portion of said chamber,
  (iii) a blind recess formed in a wall portion of said chamber opposite to said first recess,
  (iv) a first port communicating with said first recess, (v) a second port communicating with said chamber at a location spaced from both recesses,
(b) first and second plunger seal reciprocally mounted in said first recess and said blind recess, respectively,
(c) each of said plunger seals having a fluid passage therethrough and an end portion which projects into said chamber to present an annular seal face,
(d) said first seal passage being in fluid communication with said first port,
(e) a slide reciprocal in said chamber,
(f) said slide having opposite flat surfaces slidably engaged by said seal faces, thereby to guide said slide for movement between first and second positions,
(g) said slide having:
  (i) a first transverse passage ported on said opposite surfaces, the ports of said first transverse passage being located within said annular seal faces in both slide positions so that said seal passages are in constant fluid communication and so that said seals are constantly urged against said slide by fluid pressure transmitted through said first port,
  (ii) a second passage which is spaced from and oblique to said first transverse passage, said second passage having one port on the slide surface engaged by said first seal, said one port being located within the annular face of said first seal in said first slide position and being spaced from said first seal in said second position, and said second passage having another port on the slide surface engaged by said second seal, said another port being spaced from said second seal in both slide positions and being located adjacent the chamber opening of said second port in said first slide position,
(h) and means for actuating said slide from one position to another.

16. A valve as claimed in claim 15 wherein said actuating means comprises solenoid means acting on one end of said slide to move it in one direction, and a spring-biased member acting on the opposite end of said slide to urge it in a direction opposite to said one direction.

17. A valve as claimed in claim 15 wherein said valve body structure comprises a first body member having an opening through one wall thereof and a slide-receiving slot formed at the bottom of said opening, and a second cylindrical body member engaged within said opening of said first member, said second member having an inner end which cooperates with the walls of said slot to define said chamber.

18. A valve comprising in combination:
(a) valve body structure including:
  (i) a slide chamber, and
  (ii) first and second ports, said second port being in open communication with said chamber,
(b) first and second plunger seals mounted in said valve body structure,
(c) said plunger seals having fluid passages therethrough and end portions which project into said chamber and present annular seal faces,
(d) said first plunger seal passage being in communication with said first port,
(e) a slide reciprocal in said chamber between said plunger seals,
(f) said slide having opposite flat surfaces engaged by said seal faces, thereto to guide said slide for movement between first and second positions,
(g) said slide having a slot which is formed in said flat surface engaged by said first plunger seal face and which extends in the direction of slide movement, said slot being tapered in depth along its length, said slot being spaced from said first plunger seal face in said second position and being movable across said first plunger seal face as said slide is actuated to said first position in order to provide a gradual increase of area for fluid flow into said chamber,
(h) said slide having internally connected ports on said opposite surfaces that communicate said plunger seal passages in all positions of said slide,
(i) and means carried by said valve body structure for incrementally moving said slide from one position to the other.

19. In a valve, valve body structure comprising:
(a) a first member having a bore therethrough and having first and second axially aligned holes extending into said bore between the ends thereof,
(b) means mounted at each end of said first member for closing the ends of said bore to form a chamber,
(c) a second member engaged in said first hole, said second member having:
  (i) an external port,
  (ii) a passage extending from said external port to said chamber,
  (iii) a recess formed as a continuation of a portion of said passage and opening into said chamber,
(d) a third member engaged in said second hole, said third member having:
  (i) an external port,
  (ii) at least one passage communicating said port with said chamber,
  (iii) a blind recess spaced from said third member passage and opening into said chamber,
(e) and tubular plunger seals reciprocally disposed in said recesses and having end portions projecting into said chamber, said third member passage being outside the outer periphery of the tubular plunger seal mounted in said blind recess.

20. A valve body structure as claimed in claim 19 wherein said means closing one end of said bore comprises an assembly including an end member threaded into said one end of said bore, a reciprocal rod extending through said end member into said chamber, and a spring acting on the end of said rod remote from said chamber; and wherein said means closing the other end of said bore comprises another end member threaded into said other end, and a reciprocal rod projecting through said another end member into said chamber.

References Cited

UNITED STATES PATENTS

| | | | |
|---|---|---|---|
| 2,560,841 | 7/1951 | Bishop. | |
| 2,714,882 | 8/1955 | Brevard | 251—172 X |
| 2,810,542 | 10/1957 | Bryant | 251—172 |
| 2,857,129 | 10/1958 | Overholser et al. | 251—172 |
| 2,918,935 | 12/1959 | Ohls. | |
| 2,925,095 | 2/1960 | Bates | 251—172 X |
| 2,934,090 | 4/1960 | Kenann et al. | 251—282 X |
| 2,944,527 | 7/1960 | Vander Kaay | 137—625.25 X |
| 2,986,165 | 5/1961 | Hogan | 137—625.25 |
| 3,073,349 | 1/1963 | Mitchell | 251—172 X |
| 3,215,163 | 11/1965 | Henderson | 251—325 X |
| 3,321,177 | 5/1967 | Fendel et al. | 251—139 X |
| 3,324,888 | 6/1967 | Henderson | 251—172 X |
| 3,353,557 | 11/1967 | Faisandier | 251—282 |

FOREIGN PATENTS

| | | |
|---|---|---|
| 532,732 | 11/1956 | Canada. |
| 949,202 | 9/1956 | Germany. |
| 813,057 | 5/1959 | Great Britain. |

M. CARY NELSON, *Primary Examiner.*

ROBERT C. MILLER, *Assistant Examiner.*

U.S. Cl. X.R.

251—282